United States Patent

Specht et al.

[11] Patent Number: 6,053,416
[45] Date of Patent: Apr. 25, 2000

[54] AUTOMATIC HYDRONIC ZONE VALVE AND ELECTRIC CONTROLS THEREFOR

[75] Inventors: James Specht, Olyphant; Joseph Contardi, Scranton, both of Pa.

[73] Assignee: KCI Industries, Inc., Jessup, Pa.

[21] Appl. No.: 08/959,930

[22] Filed: Oct. 29, 1997

[51] Int. Cl.[7] ...................................................... F24D 3/02
[52] U.S. Cl. .............................. 236/75; 236/1 B; 237/8 A
[58] Field of Search ........................... 236/75, 1 B, 9 A; 237/8 R, 8 A

[56] References Cited

U.S. PATENT DOCUMENTS

| | | |
|---|---|---|
| 1,167,815 | 1/1916 | Gold . |
| 1,791,964 | 5/1927 | Kleinhaus et al. . |
| 2,126,732 | 8/1938 | Carnes ........................................ 237/19 |
| 2,240,731 | 5/1941 | Van Vulpen ................................. 237/8 |
| 2,255,904 | 9/1941 | Smith ........................................... 237/6 |
| 2,310,745 | 2/1943 | Parks et al. ............................... 137/139 |
| 2,323,236 | 6/1943 | Parks et al. .................................. 257/3 |
| 2,493,365 | 1/1950 | Schramm .................................... 237/9 |
| 3,123,296 | 3/1964 | Wantz et al. ............................... 236/99 |
| 3,170,630 | 2/1965 | Chadwick ................................. 236/1 B |
| 3,351,128 | 11/1967 | Barnd ........................................ 165/22 |
| 3,446,473 | 5/1969 | Barker ....................................... 251/64 |
| 3,610,523 | 10/1971 | Troy ............................................ 237/8 |
| 3,625,476 | 12/1971 | Meier ..................................... 236/75 X |
| 3,914,952 | 10/1975 | Barbier .................................. 236/75 X |
| 4,595,170 | 6/1986 | Levit . |
| 4,620,260 | 10/1986 | Oshizawa et al. . |
| 5,125,433 | 6/1992 | DeMoss et al. . |
| 5,199,456 | 4/1993 | Lore et al. . |

FOREIGN PATENT DOCUMENTS

| | | |
|---|---|---|
| 2742754 | 3/1978 | Germany . |
| 59-154007 | 9/1984 | Japan . |
| 04153542 | 5/1992 | Japan . |
| 07260035 | 10/1995 | Japan . |
| 07332530 | 12/1995 | Japan . |

Primary Examiner—Harry B. Tanner
Attorney, Agent, or Firm—Richard R. Mybeck; Peter B. Scull

[57] ABSTRACT

An automatic and improved electrical control for an automatic hydronic zone valve including a switching device for opening and closing solenoid valves based on adjustable temperature settings. Specifically, the preferred system involves a solenoid-controlled valve in which the solenoid is activated and deactivated by an electrical control circuit which relies on an external thermostatic switch and an internal relay to open and alternately close the following sub-circuits: a solenoid control sub-circuit which is directly connected to the valve solenoid, an AC to DC converter, relay control circuitry, a relay switch connection to a water circulator system and LED sub-circuits indicating power status and/or activation of the heating system. The solenoid control sub-circuit includes a series thermistor and a parallel capacitor to, respectively, slow the provision of electrical current to the solenoid to avoid "water hammer," and, quiet the electronic hum of the solenoid. Moreover, the current invention also involves simplified wiring such that only two wires each are necessary for thermostat connection, for power supply connection and for water circulator connection. But for these three external connection sites, all the other control circuit elements are disposed in a single compact unit, preferably housed on the solenoid valve itself.

18 Claims, 2 Drawing Sheets

AUTOMATIC HYDRONIC ZONE VALVE AND ELECTRIC CONTROLS THEREFOR

INTRODUCTION

The present invention is directed generally to automating hydronic zone valves with the use of electrical controls which are activated by ambient temperature changes and are especially designed to eliminate the "water hammer" and noisy solenoid "humming" that are characteristic of many commercially available systems. The electrical controls hereof also introduce new simplified wiring schemes which can be used in new systems as well as in the replacement of valves in existing hydronic systems.

BACKGROUND OF THE INVENTION

In the field of hydronics generally, temperature-controlled solenoid valves have been known since at least as early as 1916 when U.S. Pat. No. 1,167,815 issued to E. E. Gold. Gold disclosed a thermostat which was adjustable to be set to a preselected temperature so that when a sufficient change in temperature occurred, the thermostat acted as a switch to open or close a solenoid valve control circuit. When this circuit was closed by the thermostatic switch, power was supplied to a solenoid valve which energized the valve and caused the valve to close. When the circuit was opened, the power was discontinued to the solenoid which when de-energized thereby allowed the valve to open. When the valve was thus opened, temperature-conditioned water flowed through the valve to a radiator or a similarly associated temperature conditioning and/or circulating device to provide heating (or cooling) to a room or a like hydronic zone with which the thermostat and radiator was associated.

Numerous advancements have since been introduced to the art, particularly toward the reduction of certain noises associated with valve operations. These later teachings have included mechanical and/or electrical devices for noise reduction. Examples of such devices include different types of springs, dampers, TEFLON seats, relays, rectifiers, thyristors, zener diodes, and pulse-generating circuits. However, there still appears to be a need for improvements particularly in providing devices which reduce water hammer and solenoid humming in user-friendly and inexpensive devices.

Moreover, many conventional zone valves have other drawbacks as well. For example, many prior art valves require a three-wire thermostat with complicated wiring between the power supply, the thermostat and the solenoid valve or, they require a separate relay to convert the three-wire thermostats to less complicated two-wire thermostat installations. A conventional three-wire thermostat zone valve setup is shown, for example, in the U.S. patent to L Troy (U.S. Pat. No. 3,610,523). In the Troy system, each independent thermostat has three electrical contacts which comprise, in essence, a single-pole, double-throw ("SPDT") switch. In use, one contact is for the common line (also identified by the letter R in the conventional R, W, B lettering scheme) from the power source, the other two are for two distinct sub-circuits; namely a solenoid sub-circuit and a circulator sub-circuit. When switched to place the common line in contact with and close the solenoid sub-circuit, power is then supplied to a solenoid valve to close the valve. On the other hand, when the thermostat switch is moved by the appropriate temperature change to open the solenoid sub-circuit, the power to the solenoid is stopped which allows the valve to open. A still further effect of a sufficient, preselected temperature change is to connect the common line with the circulator sub-circuit to close that sub-circuit. When this sub-circuit is closed, power is provided to the circulator and/or boiler relay which causes the motor and pump to circulate the temperature conditioned water through the hydronic system. This is demand circulation.

Even so, two-wire thermostatic connections to solenoid valves are preferable because they offer greater simplicity in the wiring of such systems. However, this has heretofore been unavailable with the demand circulation functionality of a three-wire thermostat in a Troy-type of system. Therefore, the provision of a temperature-activated solenoid control which enables demand circulation in a simple two-wire thermostat wiring system would be a distinctive achievement.

BRIEF SUMMARY OF THE INVENTION

The present invention is directed generally to solenoid valves and solenoid valve control systems. More particularly, the present invention is directed to controls which provide, inter alia, automatic and improved switching for opening and closing solenoid valves based on preferred and adjustable temperature settings. Specifically, as will appear, the system of the present invention involves a solenoid-controlled valve in which the solenoid is activated and deactivated by an electrical control circuit which relies on an external thermostatic switch and an internal relay to open and alternately close various sub-circuits, one of which being a solenoid control sub-circuit which is directly connected to the valve solenoid. The other sub-circuits preferably include an AC to DC converter, a relay control sub-circuit, a relay switch connection to the water circulator system and LED sub-circuits indicating power status and/or activation of the heating system. The solenoid control sub-circuit includes a series thermistor and a parallel capacitor to, respectively, slow the delivery of electrical current to the solenoid to avoid "water hammer," and, quiet the electronic hum of the solenoid.

Moreover, the current invention also involves simplified wiring so that only two wires are necessary for the thermostat connection, only two other wires are necessary to connect to the power supply and only two more wires are necessary to connect to the water circulator. Except for these three external connections, all the other control circuit elements are disposed in a compact unit which is preferably housed in a compartment on the solenoid valve itself Accordingly, a primary object of the present invention is to provide an automated solenoid valve control system which substantially reduces mechanical and electrical noise emissions from the operating system.

Another object of the present invention is to provide an automatic hydronic zone valve which substantially reduces the "water hammer" effect which can be caused by a rapid closure of a solenoid valve.

Yet another object of the present invention is to provide an automatic hydronic zone valve which substantially reduces the humming often caused by electrical solenoid systems.

Still another object of the present invention is to provide an automatic hydronic zone valve which provides an automated solenoid valve control appliance which is compact, and may be inconspicuously disposed on or in close association with the solenoid valve itself.

Still one further object is to provide solenoid valve control and demand circulation in one simple-to-wire, readily installable device.

These and still further objects, as shall hereinafter appear, are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

DESCRIPTION OF THE PREFERRED EMBODIMENT

Figure 1:
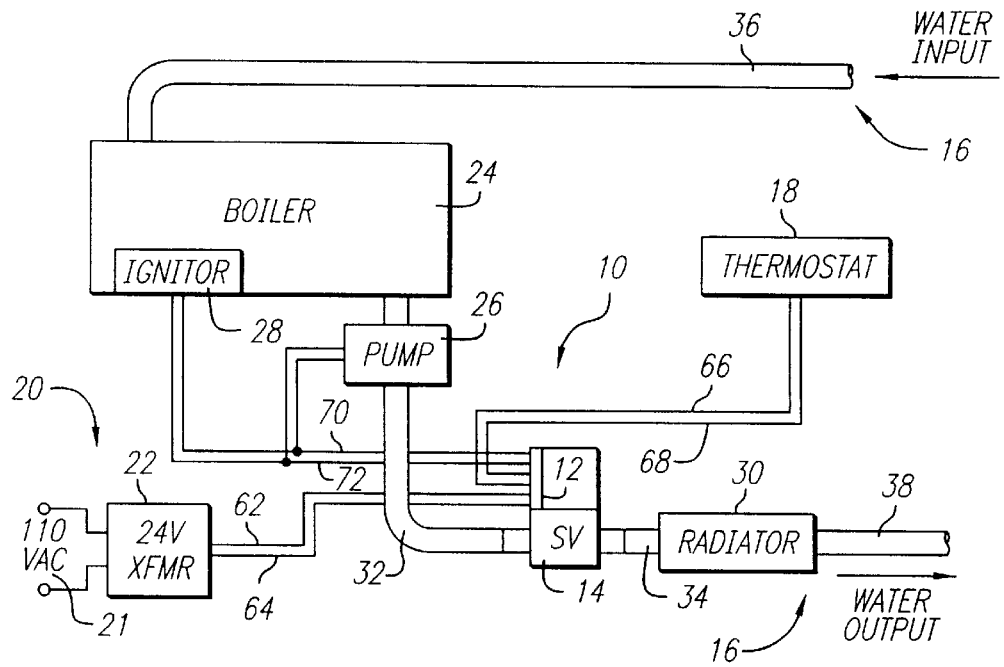
FIG. 1 is a schematic view of a portion of a hydronic system utilizing a valve and valve control system of the present invention.

The automated valve control system of the present invention is shown and referred to generally using the reference numeral 10 in the drawings. As shown in FIG. 1, control system 10 primarily comprises a control circuit 12 which is disposed on a valve unit 14 in a hydronic system 16. Circuit 12 is electrically connected to at least two and preferably to three external devices. Minimally, circuit 12 is connected to a thermostat 18 and a power source 20. Power source 20 is represented in FIG. 1 by 110 VAC connection 21 and 24V transformer 22. Circuit 12 is preferably also electrically connected to a third device; namely, a water conditioning and/or circulating appliance. This is represented in FIG. 1 by boiler 24 which here is operatively associated with a circulating pump 26. As shown in FIG. 1, the electrical connection to the water circulator generally can be made to both a pump 26 and an igniter 28 or other external circulator control circuitry as will be explained below. For simplicity, pump 26 will hereafter be referred to as circulator 26.

As is understood in the art, a hydronic system 16 comprises at least one radiator (or cooling element) 30 which is connected to a water conditioning and circulating appliance such as a boiler (or cooling device) 24 with a circulator 26 by a series of fluid pipes 32, 34. The terms radiator and boiler are used herein although it is understood that hydronic systems may also involve cooling elements and devices using similar but distinct cooling appliances which are generally interchangeable with the radiators and boilers described herein. Thus, for further simplicity of general reference, boiler 24 will hereafter be referenced as a "water conditioning appliance 24" and radiator 30 will be referred to as "conditioning element 30." Valve 14 is interposed between pipes 32, 34 to control the flow of fluid through and between pipes 32, 34.

As can be seen, hydronic system 16 also includes a water inlet pipe 36 which feeds into conditioning appliance 24, and a water output pipe 38 disposed at the outlet end of conditioning element 30. Water flowing out of outlet pipe 38 may flow back to connect with inlet pipe 36 or flow to one or more other radiators or conditioning elements (not shown) in one or more zones before connecting back with inlet pipe 36 to create a closed hydronic system. An open system, on the other hand, would have water from an external supply (not shown) flow into inlet pipe 36; and, water flowing out of pipe 38 would be drained to an external disposal line (also not shown). The present invention works with either an open or a closed hydronic system.

Figure 2:
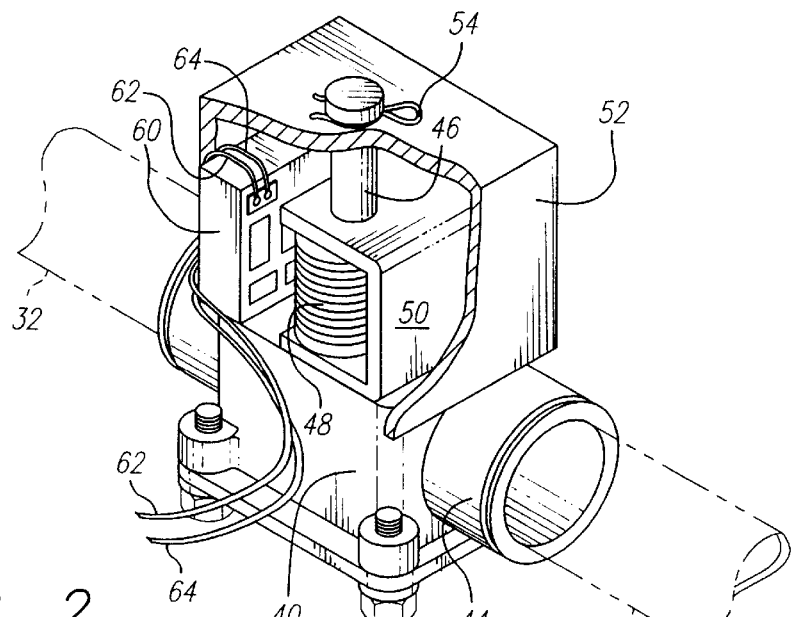
FIG. 2 is a partially broken-away, isometric view of a valve and valve control system of the present invention.

In FIG. 2, some of the more detailed components of the present invention are shown. Valve 14 is shown in greater detail having a main body 40 which has two cylindrical piping connection members; namely, inlet member 42 and outlet member 44 which are connected to pipes 32, 34 (shown in phantom). Extending up from body 40 is a plunger tube 46 which houses the valve plunger (not shown). A solenoid coil 48 is disposed in surrounding relationship around plunger tube 46 and is held in place by a C-shaped frame 50. A coil cover 52 (shown partially broken-away) is disposed on and surrounds the coil and plunger componentry of the solenoid valve. A spring-type retaining clip 54 is preferably used to engage the top portion of tube 46 and hold coil cover 52 over frame 50 and coil 48 on valve body 40.

Figure 3:
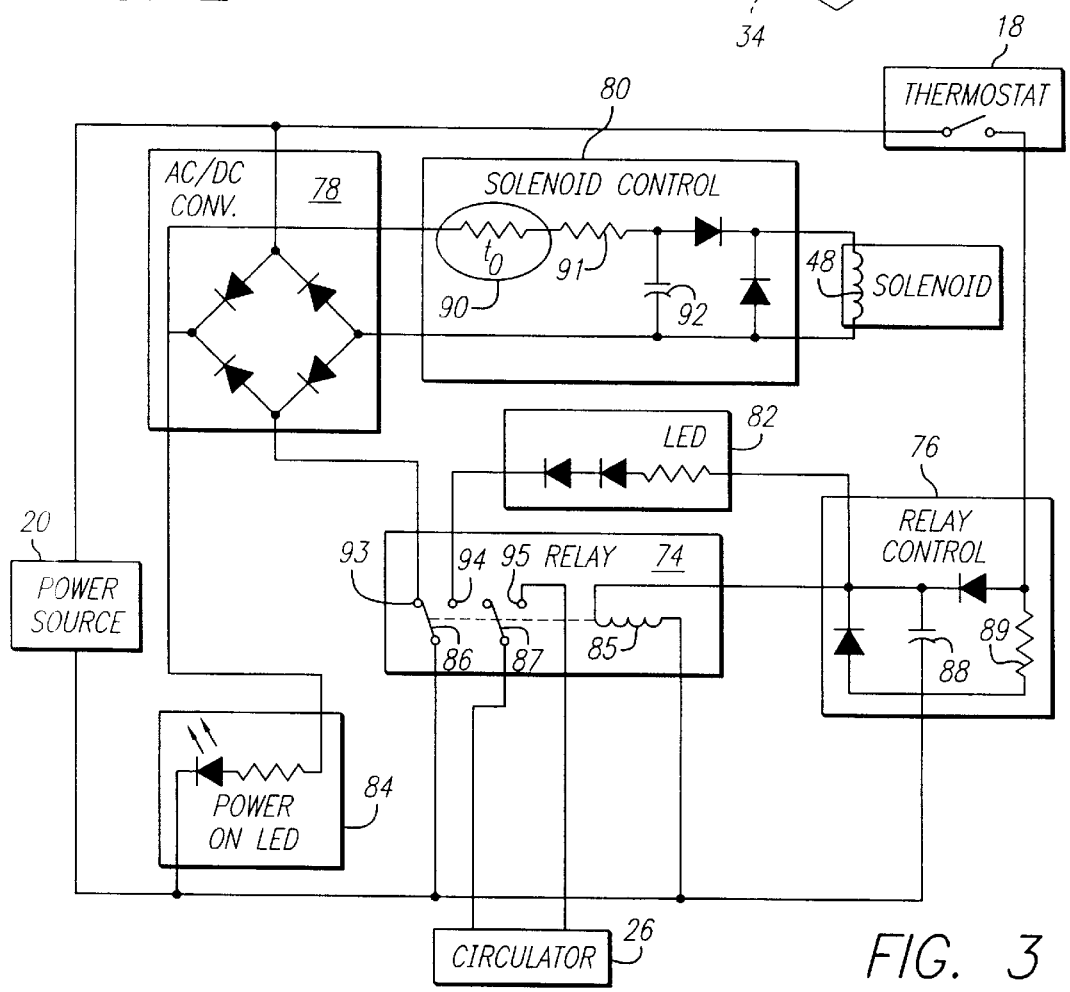
FIG. 3 is a schematic circuit diagram of the valve control system of the present invention.

Also shown in FIG. 2 is an electrical circuit board 60 which is affixed to the inner surface of one wall of cover 52. Control circuit 12 is disposed on circuit board 60. In particular, several circuit elements are disposed on board 60 to form circuit 12 as will now be described in more detail while referring to FIG. 3. FIG. 3 shows an entire electrical control system according to the present invention. Three elements; namely, the power source 20, the thermostat 18 and the circulator 26, are disposed externally of circuit board 60 and valve 14. Connection of these three devices is shown in exemplary fashion by representative wire leads 62, 64 in FIG. 2. In FIG. 1, leads 62, 64 are shown connecting power source 20 with control circuit 12; leads 66, 68 are shown connecting control circuit 12 with thermostat 18; and leads 70, 72 are shown connecting circuit 12 with circulator 26. The connections of 66, 68 and 70, 72 to circuit board 60 are similar to those shown for leads 62, 64 in FIG. 2. Of course, these connections can be made inside cover 52, as shown, or apertures can be made through cover 52 so that connections can be made without requiring disassembly of cover 52 from plunger tube 46 in which case the connections would be made through such apertures directly to circuit board 60.

Returning now to FIG. 3, one further circuit element is shown there which is not resident on circuit board 60; namely, solenoid coil 48. Nevertheless, coil 48 is an internal element of valve unit 14 and thus connection of coil 48 to board 60 is internal to solenoid valve unit 14, within cover 52. All of the remaining circuit elements of FIG. 3 are resident upon circuit board 60. In particular, circuit 12 on board 60 comprises a relay element 74, a relay control sub-circuit 76, an AC to DC converter element 78, a solenoid control sub-circuit 80 and two LED sub-circuits 82 and 84 for heat and power indications, respectively.

The preferred circuitry components for the elements of FIG. 3 are also shown therein. For example, relay 74 preferably comprises what is shown schematically as a solenoid switching apparatus 85 which controls the switching of two independent SPDT relay switches 86, 87. However, a preferred relay device having integrally disposed therein a DPDT (double pole, double throw) switch which performs the functions of the schematically distinct relay switches 86, 87 is available from OMRON. The preferred model relay is rated 2A at 30 VDC. (Exemplary OMRON relays are available from DIGI-KEY corporation, Thief River Falls, Minn., part nos. Z769-ND and Z772-ND). Relay control sub-circuit 76 preferably comprises two diodes (1 A, 1 KV) as shown, a 10 µF, 50V electrolytic capacitor 88 and a 1.5–2.2 KΩ, ½ Watt resistor 89. AC/DC converter element 78 may be four discrete diodes as shown per convention, or it may be a bridge rectifier such as RICTRONICS model RS405L which is preferred. Solenoid control sub-circuitry 80 also has two diodes (1 A, 1 KV) as shown but has distinct resistance and capacitive elements.

Primarily, solenoid control sub-circuit 80 has a thermistor 90 in series with a resistor 91, and a capacitor 92 which is in parallel with the load solenoid 48. Thermistor 90 is preferably a current inrush limiter CL130. (Such a thermistor is available from DEXTER, or KEYSTONE THERMOMETRICS, or CARBON CO). Resistor 91 is preferably a 16–18 Ω, 3W metal oxide resistor and capacitor 92 is electrolytic at 220 μF, 50 V. LED sub-circuits 82 and 84 each preferably comprise a 10–20 KΩ, ¼ Watt LED.

Figure 4:
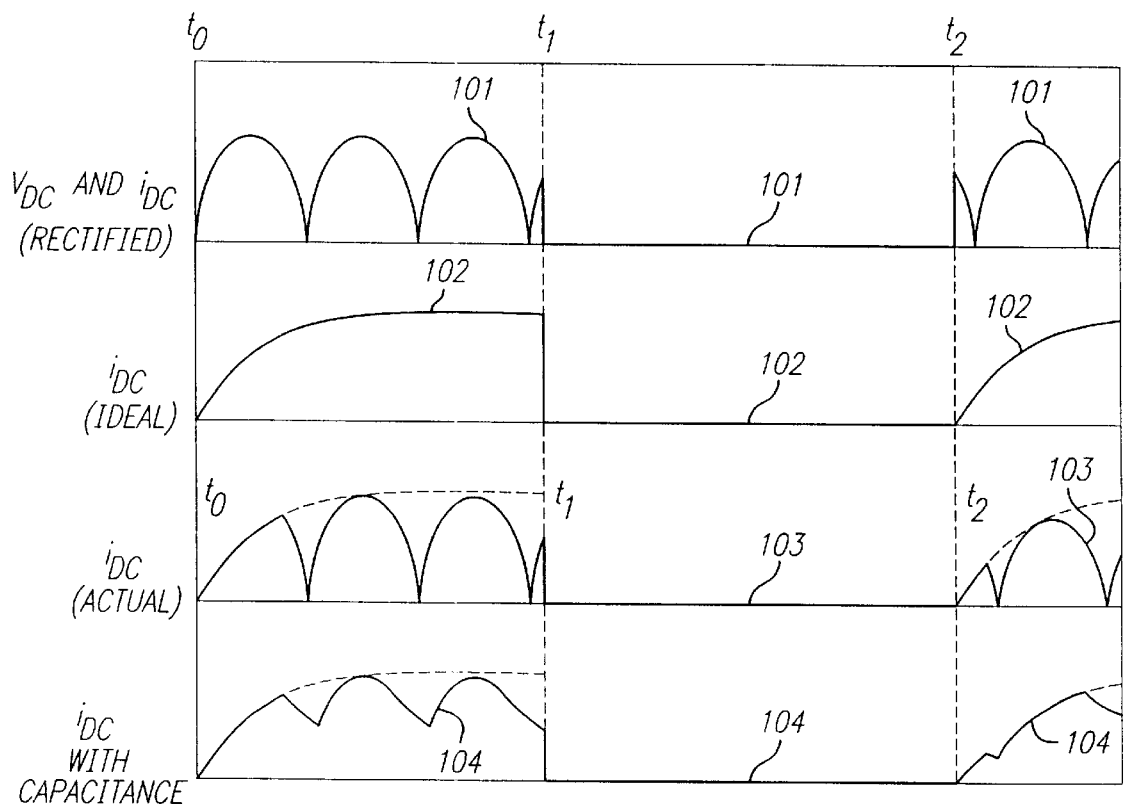
FIG. 4 is a collection of electronic waveforms associated with the present invention.

In use, power source 20 provides a continuous source of power to the entire circuit. The presumed initial status will be as shown where thermostat 18 provides an open switch to a portion of circuit 12 until the pre-selected temperature limit is reached so that no current initially flows through the relay control sub-circuit 76 or the solenoid element 85 of relay 74. Thus when the switches of relay 74 are aligned with the contacts as shown in "open" position, circuits are presented to and no current flows through the heat LED sub-circuit 82 or the circulator sub-circuit 26. Instead, a closed circuit is established through the AC/DC converter 78 by and through the closed switch 86 of relay 74. Thus, AC/DC converter 78 initially receives an AC power supply from source 20 and presents a rectified DC voltage and current to both the solenoid control sub-circuit 80 and the power LED sub-circuit 84. As will be described in greater detail below, rectified DC power runs through solenoid control sub-circuit 80 to provide power to magnetize solenoid 48 which, in the preferred embodiment, thereby moves the plunger to close the preferred normally-open solenoid valve 14 and assure that no fluid flows through pipes 32, 34. Converter 78 also provides rectified current through power LED 84 to light the LED and indicate that the system is receiving power. Waveform 101, between $t_0$ and $t_1$, in FIG. 4, shows a general exemplification of the rectified voltage ($V_{DC}$) and current ($I_{DC}$) emerging from converter 78. The waveforms of FIG. 4 depict the voltage and/or current of various parts of the assemblage as the waveforms progress with time starting with to as the point of initial power application through times $t_1$, and $t_2$ which will be explained.

The above-described operative status (with solenoid valve 14 closed and the circuit to circulation 26 open) remains until the pre-set temperature level has been reached in the room, zone or like climatic space in which thermostat 18 is disposed. At this point which in time, which is arbitrarily designated here as $t_1$, thermostat 18 switches to close the contact and allow current to then flow from the power source 20, through thermostat 18, to and through relay control 76, and then on to and through relay 74. This current then powers relay solenoid element 85 of relay 74 which then activates both relay switch elements 86, 87, to move and close with respective contacts 94, 95 so that current then flows through heat LED sub-circuit 82 and circulator sub-circuit 26. LED 82 is then lighted and circulator 26 is thus signalled to turn on and propel water through the hydronic system. Note, this is preferably a switching circuit only and does not feed any power into the circulator or water conditioning controls. Simultaneously or nearly simultaneously therewith, the power to the AC/DC converter 78 is cut off by the now open relay switch 86 which is no longer in contact with contact 93. Thus, no further power is delivered to solenoid 48 and the normally-open valve 14 is allowed to return to its open position so that fluid circulated by circulator 20 is allowed to flow through valve 14. This operative, open solenoid valve status is shown by the $t_1$ to $t_2$ portion of waveform 101 in FIG. 4.

This open valve status remains until the pre-set temperature limit is achieved whereupon thermostat 18 again presents an open circuit. This is shown by the time arbitrarily designated as $t_2$ in FIG. 4. Of course, at $t_2$, power is removed from relay 74 which thus switches back to the $t_0$ to $t_1$, state whereby circulator 26 is turned off and converter 78 is again powered up so that solenoid 48 closes solenoid valve 14. This cycle between closed valve-open circulator circuit to open valve-closed circulator circuit and back again can then proceed ad infinitum for so long as power is supplied by source 20.

Even so, control circuit 12 performs some further advantageous functions as shown by waveforms 102, 103 and 104 in FIG. 4. Waveform 102 is an ideal current waveform showing a controlled, parabolic sort of ramp upward to a maximum flat value. Thermistor 90 under ideal conditions provides this sort of waveform. This slowed ramp upward provides a gradually increasing power that when presented to a solenoid 48 in closing a valve 14, causes a slower solenoid magnetization and thus a less immediate closing of valve 14. The slower closing valve 14 thus reduces the occurrence of "water hammer" in the piping system. Thus, the parabolic type of ramp-up current as shown in waveform 102 is preferred. It is noted; however, that while waveform 102 is ideal, it may not absolutely be achievable in practice because the rectified DC voltage and current (as shown by waveform 101) are supplied under normal operating conditions to the solenoid and its solenoid control circuitry. Thus, in actual practice, the current waveform from a DC rectified source, such as converter 78, will be modified by a current inrush thermistor 90 and would look more like waveform 103 shown in FIG. 4. Waveform 103 shows that thermistor 90 would cut the initial upward current spike back to a less immediate ramp-like beginning, but as time progresses, then the waveform would eventually resemble waveform 101. This is satisfactory in operation for reducing "water hammer" although the continual parabolic spiking downward (as shown in waveform 101 and 103) does create a noticeable "humming" sound. To counter this, a capacitor 92 has been introduced into solenoid control sub-circuit 80, in parallel with the solenoid 48 load. Capacitor 92 serves to reduce the downward spiking of the current from that shown in waveform 103 to something more like waveform 104 which reduces the solenoid hum. Of course, with increased accuracy in the power supply measurement and with capacitance and resistance value substitutions commensurate with the power supplied, a waveform 104 can be made to look very near to the ideal waveform 102.

In practice, circuit 12 of the present invention provides still further advantages in its simplicity of wiring. As mentioned above and as shown in FIGS. 1, 2 and 3, only two wires each are required for connection of circuit 12 to the three external components; power source 20, thermostat 18 and circulator 26. Also, two wires are all that are required for the internal connection to solenoid coil 48. No other external or internal connections are necessary for total functionality of fully automated temperature-controlled valve operation as well as temperature-activated demand circulation. Prior systems offering such functionality usually required numerous and complex wiring schemes involving external relays, special power supplies, and three-wire thermostats inter alia. By removing these external complexities, the present invention is also a cost-effective alternative over the prior art systems.

Another advantage in the wiring simplicities of the present invention lies in the ease of installation and replacement. First, installation is simplified by the two wire schemes hereof in that the complex cross wiring of multiple components heretofore required has been eliminated. For example, many prior devices providing comparable functionality required wiring of a thermostat to the circulator as well as to the solenoid valve, as well as cross wiring of the circulator also to the solenoid valve. This complexity is removed. Furthermore, an existing three-wire thermostat can be used and simply converted to a two-wire thermostat by connecting only the R and either the W or the B contacts to the solenoid valve. One alternative is to select either W or B depending on whether heating or cooling is desired (W for cooling, B for heating). Of course, both of these could then be wired through a bipolar switch so that only one is connected at a time.

Still further, the circuitry of the present invention provides simplicity when replacing existing valves in what would otherwise appear to be an incompatible system. For example, the current invention preferably uses normally-open solenoid valves; however, an existing system using normally-closed solenoid valves with three-wire thermostats may be converted easily by replacing the existing valves with valve(s) 14 of the present invention, then wiring two wires (R and B, for example) of the three-wire thermostats to the respective circuit(s) 12, and then connecting the circulator to the circuits 12 as disclosed herein.

Moreover, as shown herein, circuit 12 and valve 14 are packaged as a unit; however, a foreseeable alternative embodiment entails the packaging and distribution of control circuit(s) 12 independently of, but readily attachable to a solenoid valve like valve 14 together but not as an integral unit; rather, allowing for optional use of circuit 12 with valve 14.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed:

1. An electrical control system for an automatic hydronic zone valve comprising: a solenoid control circuit connectable to a solenoid load, said solenoid control circuit having a thermistor connectable in series with said solenoid load, said solenoid load being operative to open and close said hydronic zone valve; said solenoid control circuit further comprising a capacitor connected in parallel with said solenoid load, said capacitor being operative to reduce solenoid hum; said solenoid control circuit further being connected to a relay switching circuit and said relay switching circuit further being connected to a thermostatic switch and to a circulator control circuit.

2. An electrical control system for an automatic hydronic zone valve comprising: a solenoid control circuit connectable to a solenoid load, said solenoid load being operative to open and close said hydronic zone valve, said solenoid control circuit having a thermistor connectable in series with said solenoid load and a capacitor connected in parallel with said solenoid load and being operative therewith to reduce the solenoid hum thereof.

3. A temperature-controlled solenoid control system for an automatic hydronic zone valve comprising: a power source; an adjustable thermostatic switch, and a solenoid control circuit connectable to said power source and a solenoid load, said thermostatic switch being connected to said power source in parallel to said solenoid control circuit, said thermostatic switch being adjustable between open-circuit and closed-circuit states upon sensing a preselected temperature selected from a range of temperatures and thereby providing a current dividing differential to said solenoid control circuit which thereby affects the power provided to said solenoid load through said solenoid control circuit; said solenoid control circuit further including a thermistor in series with the solenoid load and a capacitor in parallel with the solenoid load.

4. A solenoid control system according to claim 3 in which said solenoid control circuit is connected to a relay switching circuit.

5. A solenoid control system according to claim 4 in which said relay switching circuit is connected to said thermostatic switch.

6. A solenoid control system according to claim 4 in which said relay switching circuit is connected to a circulator control circuit.

7. A hydronic zone valve control appliance for use in connection with a solenoid-operated hydronic zone valve, said control appliance comprising a control circuit which is electrically connected to the solenoid of the solenoid-operated hydronic zone valve, said control circuit comprising a solenoid control sub-circuit and a relay sub-circuit;

said solenoid control sub-circuit being connected to the solenoid as the connection of the control circuit to the solenoid, said solenoid control sub-circuit being adapted to control the operation of the solenoid to alternately open and close the hydronic zone valve, said solenoid control sub-circuit further comprising a thermistor disposed in series with said solenoid and a capacitor disposed in parallel with said solenoid; and said relay sub-circuit being connected to said solenoid control sub-circuit to control the activation of said solenoid control sub-circuit;

whereby said control circuit is adapted to be connected to an external power source and to an external thermostatic switch, said external power source being adapted to provide power to all elements of said control circuit and to the solenoid through the connection of said solenoid control sub-circuit to the solenoid, and the thermostatic switch being adapted to alternately switch open and switch closed the relay sub-circuit to thereby control the activation of said solenoid control sub-circuit.

8. A hydronic zone valve control appliance according to claim 7 in which said control circuit is disposed on the solenoid-operated hydronic zone valve.

9. A hydronic zone valve control appliance according to claim 8 in which the hydronic zone valve has a cover and said control circuit is affixed to the inner surface thereof.

10. A hydronic zone valve control appliance according to claim 9 in which said cover has two power ports for the electrical connection of said control circuit to said external power source and two thermostat ports for the electrical connection of said control circuit to said external thermostatic switch.

11. A hydronic zone valve control appliance according to claim 7 in which said control circuit is disposed on a circuit board.

12. A hydronic zone valve control appliance according to claim 11 in which the hydronic zone valve has a cover and said circuit board is affixed to the inner surface thereof.

13. A hydronic zone valve control appliance according to claim 7 in which said control circuit is further adapted to be electrically connected to an external circulator.

14. A hydronic zone valve control appliance according to claim 13 in which the connection of said control circuit to said external circulator is through said relay sub-circuit.

15. A hydronic zone valve control appliance according to claim 14 in which the hydronic zone valve has a cover and said control circuit is affixed to the inner surface thereof and in which said cover has two power ports for the electrical connection of said control circuit to said external power source and two thermostat ports for the electrical connection of said control circuit to said external thermostatic switch and two circulator ports for the electrical connection of said control circuit to said external circulator.

16. A hydronic zone valve control appliance according to claim 7 in which said control circuit further comprises an internal AC/DC converter connected to said solenoid control sub-circuit and connected to said relay sub-circuit and is thereby disposed therebetween.

17. A hydronic zone valve control appliance according to claim 7 in which said control circuit further comprises an internal power LED connected substantially in parallel across the external power connections to light when power is provided to the control circuit.

18. A hydronic zone valve control appliance according to claim 7 in which said control circuit further comprises an internal relay LED connected substantially in series with the external thermostatic switch connections to light when power is provided to the relay sub-circuit.

* * * * *